US00RE35495E

United States Patent [19]

Bolza-Schuenemann et al.

[11] E Patent Number: Re. 35,495

[45] Reissued Date of Patent: Apr. 29, 1997

[54] PRINTED SHEET MONITORING ASSEMBLY

[75] Inventors: Claus A. Bolza-Schuenemann; Johannes G. Schaede, both of Wuerzburg, Germany

[73] Assignee: Koenig & Bauer Aktiengesellschaft, Wurzburg, Germany

[21] Appl. No.: 585,737

[22] Filed: Jan. 16, 1996

Related U.S. Patent Documents

Reissue of:

[64] Patent No.: 5,329,852
Issued: Jul. 19, 1994
Appl. No.: 926,697
Filed: Aug. 10, 1992

[30] Foreign Application Priority Data

Aug. 14, 1991 [DE] Germany ..... 4126799

[51] Int. Cl.[6] ..... B41F 13/24

[52] U.S. Cl. ..... 101/232; 101/233

[58] Field of Search ..... 101/232, 233, 101/480; 271/90, 96, 109, 110

[56] References Cited

U.S. PATENT DOCUMENTS

| | | | |
|---|---|---|---|
| 3,730,514 | 5/1973 | Burkhardt | 271/96 |
| 4,127,263 | 11/1978 | Wenthe | 271/112 |
| 4,357,007 | 11/1982 | Mens Franchiscus et al. | 271/96 |
| 5,029,525 | 7/1991 | Jeschke | 101/232 |
| 5,052,675 | 10/1991 | Shehata et al. | 271/98 |

FOREIGN PATENT DOCUMENTS

| | | |
|---|---|---|
| 0178470 | 9/1985 | European Pat. Off. . |
| 0410253 | 1/1991 | European Pat. Off. . |
| 57-195054 | 5/1981 | Japan . |
| 60-125506 | 12/1983 | Japan . |

*Primary Examiner*—Edgar S. Burr
*Assistant Examiner*—Anthony H. Nguyen
*Attorney, Agent, or Firm*—Jones, Tullar & Cooper, P.C.

[57] ABSTRACT

A printed sheet monitoring assembly utilizes a suction box with a planar lower suction surface to hold a printed sheet to be monitored in a crease-free manner. An area array image sensor is positioned beneath the suction box and is actuated by a trigger device to scan the printed sheet. The sheet grippers on an endless conveying chain are arranged on the chain to be in vertical alignment during scanning of the printed sheet.

9 Claims, 2 Drawing Sheets

PRINTED SHEET MONITORING ASSEMBLY

Matter enclosed in heavy brackets [ ] appears in the original patent but forms no part of this reissue specification; matter printed in italics indicates the additions made by reissue.

BACKGROUND OF THE INVENTION

The present invention is directed generally to a printed sheet monitoring assembly. More particularly, the present invention is directed to a printed sheet monitoring assembly for controlling printed sheets. Most specifically, the present invention is directed to a printed sheet monitoring assembly for controlling printed sheets in a sheet fed rotary press. The printed sheets are transferred by spaced gripper bars which extend between two parallel endless chains. A suction box is used to pull the printed sheets tightly against a surface of the suction box. While each individual sheet is so situated, it can be checked by a CCD line or area array image sensor which is placed below the suction box so as to not be obstructed by the parallel endless gripper chains.

The opto-electronic device, such as a CCD line or area array image sensor requires a clear, unobstructed view of the sheet or sheets whose quality is being evaluated. The use of sheet grippers and endless gripper chains presents problems since the opto-electronic sheet quality inspecting sensor will be disrupted by the pressure of the sheet grippers or endless gripper chains in its field of scan.

A need exists for a printed sheet monitoring assembly which will provide for the accurate, automatic scanning and monitoring of printed sheets. The printed sheet monitoring assembly in accordance with the present invention provides such a device and is a significant improvement over prior art devices.

SUMMARY OF THE INVENTION

It is an object of the present invention to provide a printed sheet monitoring assembly.

Another object of the present invention is to provide a printed sheet monitoring assembly for controlling printed sheets.

A further object of the present invention is to provide a printed sheet monitoring assembly for controlling printed sheets in a sheet-fed rotary press.

Still another object of the present invention is to provide a printed sheet monitoring assembly which utilizes a sheet gripping suction box.

Even a further object of the present invention is to provide a printed sheet monitoring assembly which utilizes sheet grippers and endless gripper chains to transport the sheets being monitored.

Still even another object of the present invention is to provide a printed sheet monitoring assembly which utilizes an opto-electronic sensor.

As will be discussed in detail in the description of the preferred embodiment which is set forth subsequently, the printed sheet monitoring assembly in accordance with the present invention utilizes a pair of spaced parallel endless chains to move a series of sheet grippers in an endless path between first and second elements, such as a printing unit and a sheet delivery of a press. A suction box is placed above the paths of travel of the upper course of the endless chains that support the sheet grippers. This suction box draws the sheets being transported, and which are to be monitored, tight against a lower surface of the suction box. The opto-electronic device, such as a CCD line or area array image sensor is placed below the suction box. It is actuated by a suitable synchronization device to review the quality of the printed product at a time when the sheet gripper bars attached to the upper and lower portions of the endless chains are vertically aligned and out of the field of view of the sensor.

The printed sheet monitoring assembly of the present invention provides an assembly which allows the use of a CCD line or area array image sensor to inspect a line or the surface of a printed sheet as the sheet passes between two operating areas of a sheet-fed rotary press. The images generated by the CCD-line or area array image sensor can be utilized to perform corrective adjustments to the rotary press. The placement of the opto-electronic device below the suction box allows the printed sheet monitoring assembly of the present invention to scan the printed surface of a sheet as the sheet passes above the device.

The printed sheet monitoring assembly of the present invention overcomes the limitations of the prior devices and is a substantial advance in the art.

BRIEF DESCRIPTION OF THE DRAWINGS

While the patentable features of the printed sheet monitoring assembly in accordance with the present invention are set forth with particularity in the appended claims, a full and complete understanding of the invention may be had by referring to the detailed description of the preferred embodiment which is presented subsequently, and as illustrated in the accompanying drawing figures in which:

DESCRIPTION OF THE PREFERRED EMBODIMENT

Figure 1:
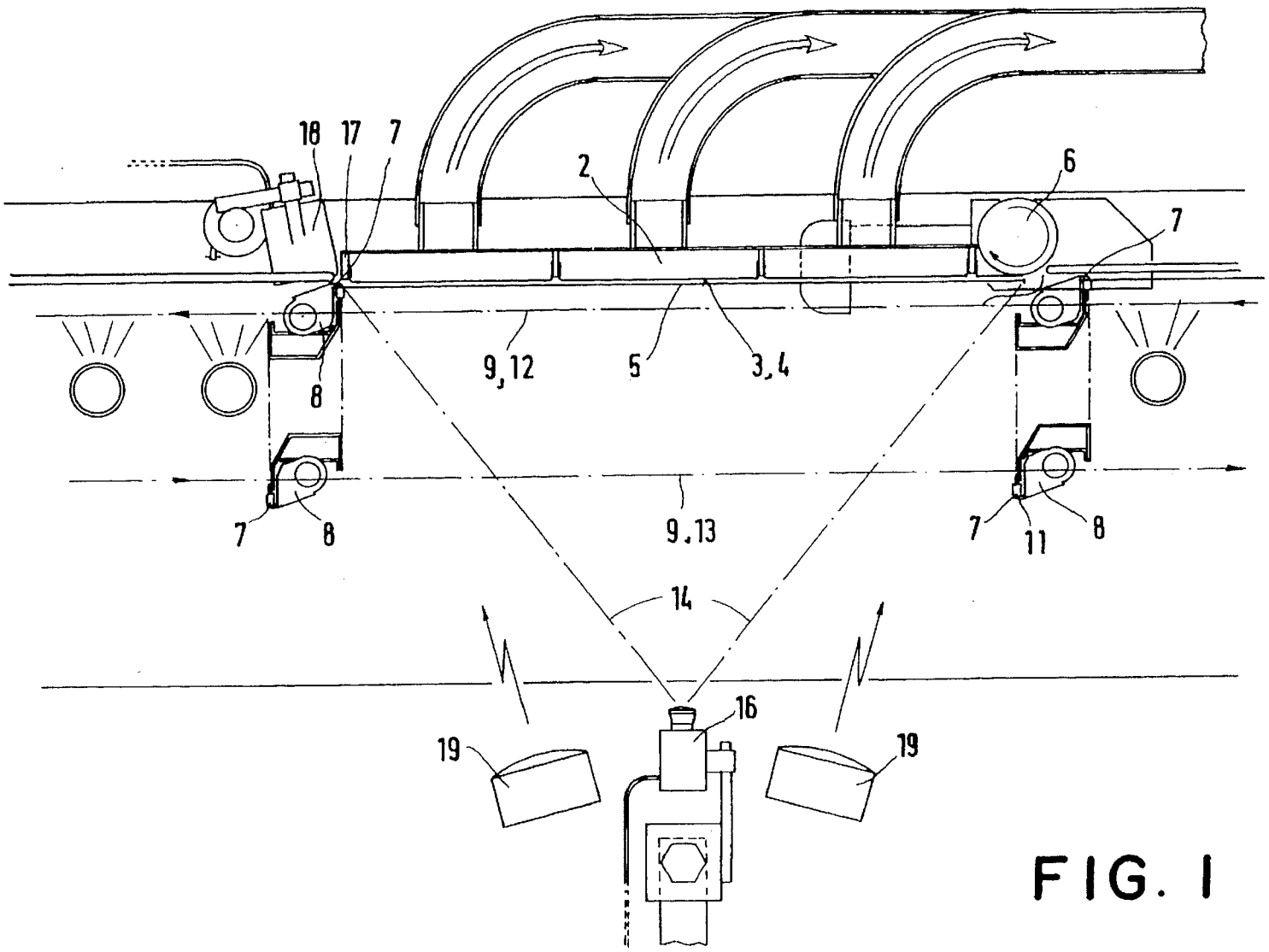
FIG. 1 is a schematic side elevation view of a printed sheet monitoring assembly in accordance with the present invention; and, FIG. 2 is a schematic side elevation view of a modification of the printed sheet monitoring assembly of FIG. 1.

Referring now to FIG. 1, there may be seen a schematic depiction of a printed sheet monitoring assembly in accordance with the present invention. The printed sheet monitoring assembly is placed in an interspace 1, generally between two elements, such as, for example, a printing unit and a sheet delivery of a sheet fed rotary press, all of which are not specifically shown in the drawings. It will be understood that the two particular portions of the rotary press between which the printed sheet monitoring assembly is placed is not of patentable significance. Obviously, if the quality of the printed sheets is to be inspected and controlled, the monitoring assembly must be placed downstream in the direction of sheet travel of at least a first printing unit.

As may be seen in FIG. 1, a suction box 2 is positioned in the interspace 1. This suction box 2 has a planar, lower suction area 3 which is provided with a plurality of suction openings 4. The suction box 2 is joined to a suction air source which is not specifically shown, by one or more suction tubes. Since the purpose of the suction box 2 is to hold an entire printed sheet against the planar [lower] suction surface 3, it will be understood that the overall length of the suction box 2 will be slightly greater than the longest length of the longest sheet that will be printed in the rotary press with which the printed sheet monitoring assembly is associated. A suitable suction roller 6 may be positioned ahead of, or before, in the direction of sheet travel the suction box 2.

Each printed sheet, generally at 5, which is printed by the offset rotary press, is transported between stations by being grasped by chain guided grippers 7. These sheet grippers 7 are parts of a sheet gripper system and each individual sheet gripper 7 is arranged on a gripper bar, generally at 8. Each gripper bar 8 extends transversely across the path of sheet travel and is attached at its ends between two spaced, generally parallel conveyor chains 9. These conveyor chains 9 are endless and carry a plurality of gripper bars 8 and associated sheet grippers 7. The particular number of gripper bars 8 is dependent on the distance which they have to travel; i.e. the distance from the printing unit to the sheet delivery and back, and on the maximum length of the sheets being transported. The spacing between subsequent gripper bars 8 must be slightly greater than the longest length of the sheets 5 to be printed.

Referring again to FIG. 1, the spaced parallel endless conveyor chains 9 travel in an upper path which is just beneath the lowest point of the planar [lower] suction area 3 of the suction box 2 and the lowest point of the suction roller 6 which is positioned before the suction box 2 in the direction of sheet travel as indicated by the arrows in the upper path of travel of the endless chains 9. The spacing between the planar [lower] suction surface 3 of the suction box 2 and the sheet grippers 7 is selected in such a way that the sheets 5 conveyed by the grippers 7 are pulled against the suction surface 3 and are held tightly against this planar surface. Since the quality of the printed sheets 5 will be evaluated by, and controlled in response to an opto-electronic device, such as a CCD-line or area array image sensor, generally at 16, and as will be discussed in detail shortly, it is important that the printed sheets 5 be held against the [lower] planar surface 3 of the suction box 2 in a tight, crease-free alignment.

In the printed sheet monitoring assembly of the present invention, the spacing of the gripper bars 8 and the length of the endless chains 9 are arranged so that when the gripper bars 8 in an upper gripper bar path 12 and the gripper bars in a lower gripper bar path 13 pass beneath the suction box 2, they are arranged vertically directly above or below each other as may be seen in the sole drawing figure. This means that as the gripper bars 8 and endless chains 9 pass through a conical scanning area 14 of an opto-electronic device, such as a CCD line or area array image sensor 16 which is positioned beneath the suction box 2, the gripper bars 8 on the upper gripper bar path 12 will be vertically directly above the gripper bars 8 on the lower gripper bar path 13. This limits interference of the gripper bars 8 and the endless conveyor chains 9 with the conical scanning area 14 of the sensor 16.

As was alluded to previously, the opto-electronic device 16 is placed beneath the suction box 2 since the printed surface of the sheet 5 to be monitored and controlled is on the side of the sheet 5 facing away from the planar [lower] surface 3 of the suction box 2. During scanning of the sheet 5 by the sensor 16, the sheet 5 is drawn tightly against the planar [lower] surface 3 of the suction box 2. This eliminates any creases or wrinkles from forming in the sheet. Since the spacing of the gripper bars 8 on the chains 9 and the overall lengths of the endless conveyor chains 9 have been selected to position the gripper bars 8 vertically aligned on the upper and lower gripper bar paths 12 and 13 in the area of the conical scanning area, the view of the surface monitoring sensor 16 is unimpeded at the moment when the device sends out a measuring impulse.

In operation, the sensor 16 is [positioned generally beneath the lower] *generally oriented toward* planar surface 3 of the suction box 2. The device 16 may be placed beneath the lower gripper bar path 13 or intermediate the lower path 13 and the upper gripper bar path depending on the type of printed sheet monitoring; i.e. line or surface monitoring that the sensor 16 is to accomplish. The conical scanning path 14 of the sensor 16 will be arranged so that the downstream end 17 of the sensor measuring position, as defined by the conical scanning area 14 will be at the sheet gripper 8 which is downstream of the suction box 2. A generally known trigger device, generally at 18, is used to provide an operating signal to the sensor as well as to one or more adjacent flash devices 19. The image from the sensor 16 can then be sent to an electronic evaluation device which will analyze the image and which can then relay instructions to the printing press, as necessary. The evaluation device can include a microcomputer and a suitable program for making sure that there are ideal conditions, with regard to the controlling of the recording characteristics of the sensor 16 and the speed and intensity of the flash device 19 for all speeds of sheet transport.

At the moment when the area array image sensor 16 is operated in response to the trigger device 18, the leading edge of the sheet 5 will be at the measuring position 17 of the sensor 16. At that point, the sheet 5 to be monitored is held against the planar [lower] suction area 3 of the suction box 2 in a totally crease-free manner. The flash and scanning operation of the sensor 16 is coordinated with the sheet position by the trigger device 18 so that the sheet has not begun to leave the suction area 3 of the suction box 2. A distance "a" from the sensor 16 to the sheet 5 to be monitored is constant during operation of the flash devices 19 and the sensor 16. The horizontal position of the sensor 16 is also fixed.

Figure 2:
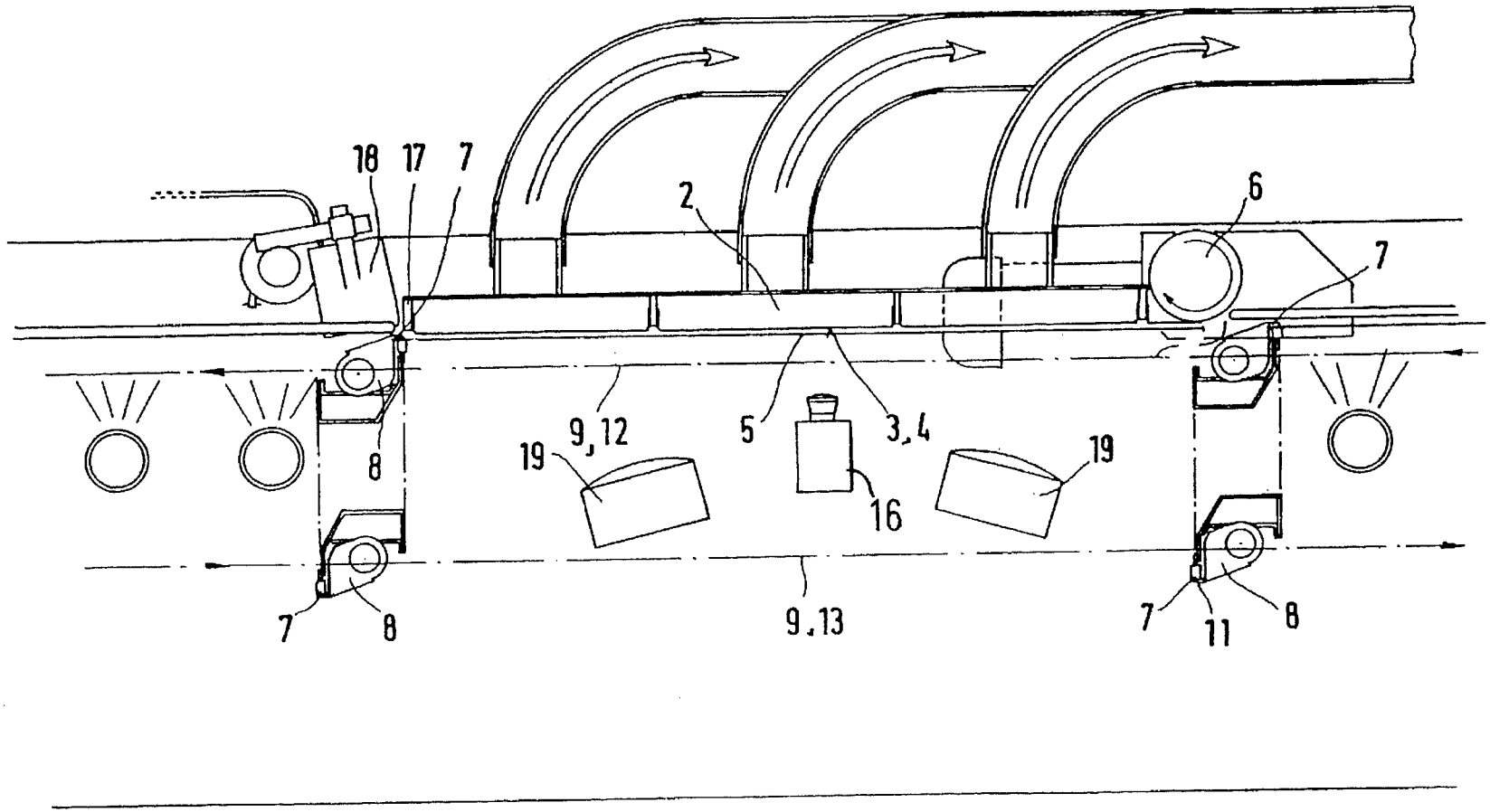

The position of the CCD-monitoring sensor 16 can be varied in accordance with whether the sensor 16 is a CCD-area array image sensor or line monitoring device. In case the device 16 is a CCD-area array image sensor, it can be arranged between the upper gripper bar path 12 and the lower gripper as illustrated in FIG. If the sensor 16 is located between these upper and lower paths, the flash device 19 will also be positioned between the two paths as illustrated in FIG. 2.

While a preferred embodiment of a printed sheet monitoring assembly in accordance with the present invention has been set forth fully and completely hereinabove, it will be apparent to one of skill in the art that a number of changes in, for example the type of sheet gripper bars, the drive means for the endless conveying chains, the source of suction air and the like can be made without departing from the true spirit and scope of the present invention which is accordingly to be limited only by the following claims.

What is claimed is:

1. A printed sheet monitoring assembly usable to monitor a printed sheet in a sheet-fed rotary press, said printed sheet monitoring assembly comprising:

a suction box having a planar lower suction surface for tightly holding a sheet to be monitored in a crease-free manner, said suction box being positioned intermediate first and second spaced processing devices of the press;

first and second spaced, endless conveyor chains passing beneath said suction surface and defining an upper chain path and a lower chain path;

a plurality of sheet gripping means secured to, and extending between said conveyor chains;

an opto-electronic image sensor positioned beneath said suction surface, said sensor being operable to monitor a printed sheet held against said suction surface; and trigger means operable to activate said sensor when a printed sheet to be monitored is properly positioned on said suction surface.

2. The printed sheet monitoring assembly of claim 1 wherein said sensor is a CCD-area array image sensor.

3. The printed sheet monitoring assembly of claim 1 further including a flash device operable by said trigger means to flash when said image sensor is activated.

4. The printed sheet monitoring assembly of claim 1 wherein said sensor is positioned below said lower chain path.

5. The printed sheet monitoring assembly of claim 1 wherein said sensor is positioned between said upper chain path and said lower chain path.

6. The printed sheet monitoring assembly of claim 1 wherein each of said sheet gripping means includes a gripper bar, each said sheet gripper bar in said upper chain path being vertically aligned with a sheet gripper bar in said lower chain path when said sensor is activated.

*7. A printed sheet monitoring assembly useable to monitor a printed sheet in a sheet-fed rotary press, said printed sheet monitoring assembly comprising:*

*a suction box having a planar suction surface for tightly holding a sheet to be monitored in a crease-free manner, said suction box being in the vicinity of a press for receiving printed sheets transported therefrom;*

*an endless chain conveyor passing in proximity to said suction surface and defining a chain path for transporting printed sheets to and from said suction box;*

*a plurality of sheet gripping means secured to said endless chain conveyor for gripping printed sheets;*

*an opto-electronic image sensor generally oriented toward said suction surface, said sensor being operable to monitor a printed sheet held against said suction surface; and*

*trigger means operable to activate said sensor when a printed sheet to be monitored is properly positioned on said suction surface.*

*8. The printed sheet monitoring assembly of claim 7 wherein said sensor is a CCD-area array image sensor.*

*9. The printed sheet monitoring assembly of claim 7 further including a flash device operable by said trigger means to flash when said image sensor is activated.*

* * * * *